United States Patent
Okada et al.

(10) Patent No.: US 10,566,641 B2
(45) Date of Patent: Feb. 18, 2020

(54) FUEL CELL SYSTEM AND CONTROL METHOD FOR CONTROLLING MOISTURE CONTENT OF FUEL

(71) Applicant: NISSAN MOTOR CO., LTD., Yokohama-shi, Kanagawa (JP)

(72) Inventors: Keiji Okada, Kanagawa (JP); Kentarou Yajima, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 16/062,264

(22) PCT Filed: Nov. 10, 2016

(86) PCT No.: PCT/JP2016/083369
§ 371 (c)(1),
(2) Date: Jun. 14, 2018

(87) PCT Pub. No.: WO2017/104316
PCT Pub. Date: Jun. 22, 2017

(65) Prior Publication Data
US 2019/0020047 A1 Jan. 17, 2019

(30) Foreign Application Priority Data
Dec. 15, 2015 (JP) .................................. 2015-243981

(51) Int. Cl.
*H01M 8/12* (2016.01)
*H01M 8/04828* (2016.01)
(Continued)

(52) U.S. Cl.
CPC ............. *H01M 8/12* (2013.01); *H01M 8/045* (2013.01); *H01M 8/04225* (2016.02);
(Continued)

(58) Field of Classification Search
CPC .............. H01M 8/12; H01M 8/04753; H01M 8/04835; H01M 8/0687; H01M 8/04776;
(Continued)

(56) References Cited

U.S. PATENT DOCUMENTS 4,978,430 A * 12/1990 Nakagawa ............. B01D 53/22
159/DIG. 27
6,458,478 B1 * 10/2002 Wang ....................... C01B 3/342
429/411
(Continued)

FOREIGN PATENT DOCUMENTS

JP     2005-288320 A     10/2005
JP     2007-20407 A     2/2007
(Continued)

*Primary Examiner* — Maria Laios
*Assistant Examiner* — Kwang Han
(74) *Attorney, Agent, or Firm* — Foley & Lardner LLP

(57) ABSTRACT

A fuel cell system including: a solid oxide type fuel cell that is supplied with an anode gas and a cathode gas to generate an electric power; a fuel tank that stores a water-containing fuel containing water; a fuel supply passage that couples the fuel cell to the fuel tank; a reformer disposed on the fuel supply passage, the reformer reforming the water-containing fuel into the anode gas; a separator disposed on the fuel supply passage in an upstream side with respect to the reformer, the separator separating the water contained in the water-containing fuel; a detector disposed in the upstream side with respect to the reformer, the detector detecting or estimating a moisture content contained in the water-containing fuel; and a control unit that controls the separator. The control unit controls the separator on the basis of the moisture content detected or estimated by the detector.

15 Claims, 15 Drawing Sheets

(51) Int. Cl.
*H01M 8/04746* (2016.01)
*H01M 8/04291* (2016.01)
*H01M 8/04492* (2016.01)
*H01M 8/04223* (2016.01)
*H01M 8/0662* (2016.01)
*H01M 8/0432* (2016.01)
*H01M 8/0438* (2016.01)
*H01M 8/124* (2016.01)
*H01M 8/04225* (2016.01)
*H01M 8/04228* (2016.01)
*H01M 8/04302* (2016.01)
*H01M 8/04303* (2016.01)
*H01M 8/0612* (2016.01)

(52) U.S. Cl.
CPC ... *H01M 8/04228* (2016.02); *H01M 8/04268* (2013.01); *H01M 8/04291* (2013.01); *H01M 8/04302* (2016.02); *H01M 8/04303* (2016.02); *H01M 8/04753* (2013.01); *H01M 8/04776* (2013.01); *H01M 8/04835* (2013.01); *H01M 8/0618* (2013.01); *H01M 8/0687* (2013.01); *H01M 8/04328* (2013.01); *H01M 8/04388* (2013.01); *H01M 8/0662* (2013.01); *H01M 2008/1293* (2013.01)

(58) Field of Classification Search
CPC ......... H01M 8/04268; H01M 8/04228; H01M 8/04225; H01M 8/04303; H01M 8/0618; H01M 8/04302
See application file for complete search history.

(56) References Cited

U.S. PATENT DOCUMENTS

| | | | |
|---|---|---|---|
| 8,735,007 B2 | 5/2014 | Nakanishi et al. | |
| 9,391,335 B2 | 7/2016 | Iwakiri | |
| 2010/0047634 A1* | 2/2010 | Nguyen | H01M 8/04022 429/513 |
| 2010/0119893 A1 | 5/2010 | Nakanishi et al. | |
| 2015/0188174 A1 | 7/2015 | Iwakiri | |

FOREIGN PATENT DOCUMENTS

| | | |
|---|---|---|
| JP | 2008-293850 A | 12/2008 |
| JP | 2010-27347 A | 2/2010 |
| JP | 2010-190210 A | 9/2010 |
| JP | 2014-2929 A | 1/2014 |

* cited by examiner

FUEL CELL SYSTEM AND CONTROL METHOD FOR CONTROLLING MOISTURE CONTENT OF FUEL

TECHNICAL FIELD

The present invention relates to a fuel cell system and a control method for the fuel cell system.

BACKGROUND ART

There has been known a Solid Oxide Fuel Cell (SOFC) where anode gas is supplied to one side and cathode gas (air and similar gas) is supplied to the other side to be configured to operate at a relatively high temperature. This SOFC uses a water-containing fuel such as water-containing ethanol. Since the fuel contained in such a water-containing fuel is easily evaporated compared with water, a moisture content of the water-containing fuel increases in a fuel tank. Using such a water-containing fuel having the high moisture content possibly reduces a power generation performance of the fuel cell.

Therefore, for example, JP2010-190210A discloses a technique where the fuel evaporated in the fuel tank is liquefied again to be recovered and the liquefied fuel is returned to the fuel tank.

SUMMARY OF INVENTION

However, in the technique disclosed in JP2010-190210A, the moisture content of the water-containing fuel in the fuel tank cannot be adjusted while a fuel cell system is stopped. Therefore, when the fuel cell system is activated and similar timing, the moisture content of the water-containing fuel is not adjusted to be appropriate and is possibly inappropriate for using to drive the fuel cell.

It is an object of the present invention to provide a fuel cell system configured to appropriately adjust a moisture content of a water-containing fuel used for driving a fuel cell.

According to one embodiment of this invention, a fuel cell system including: a solid oxide type fuel cell that is supplied with an anode gas and a cathode gas to generate an electric power; a fuel tank that stores a water-containing fuel containing water; a fuel supply passage that couples the fuel cell to the fuel tank; a reformer disposed on the fuel supply passage, the reformer reforming the water-containing fuel into the anode gas; a separator disposed on the fuel supply passage in an upstream side with respect to the reformer, the separator separating the water contained in the water-containing fuel; a detector disposed in the upstream side with respect to the reformer, the detector detecting or estimating a moisture content contained in the water-containing fuel; and a control unit that controls the separator. The control unit controls the separator on the basis of the moisture content detected or estimated by the detector.

DESCRIPTION OF EMBODIMENTS

The following describes the embodiments of the present invention with reference to the attached drawings.

First Embodiment

Figure 1:
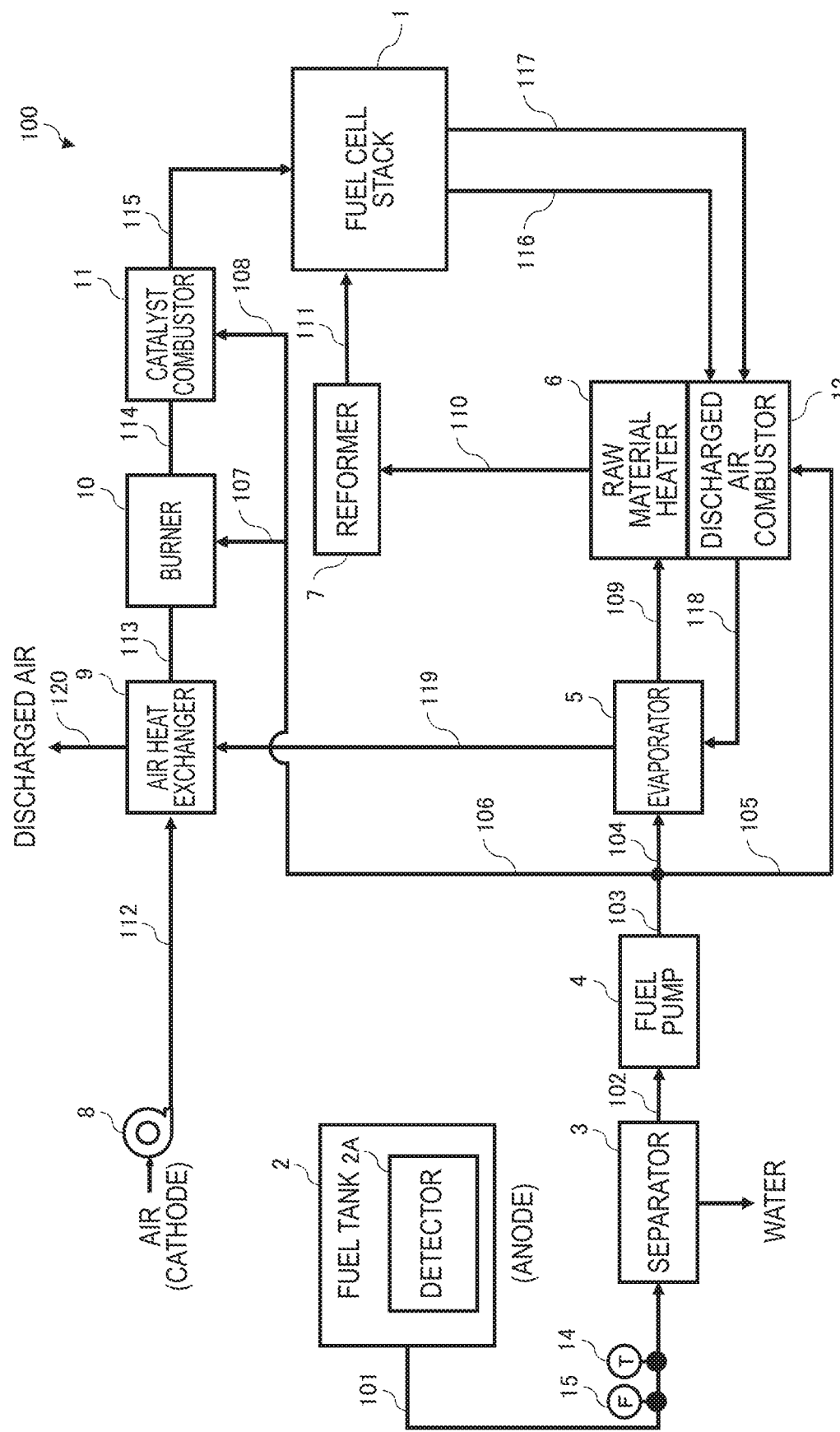
FIG. 1 is a block diagram of a fuel cell system of a first embodiment.

FIG. 1 is a block diagram illustrating a main configuration of a Solid Oxide Fuel Cell (SOFC) system in a first embodiment. This system generates electric powers used for driving an electric vehicle and similar purpose.

In a fuel cell stack 1 as the SOFC, cells are stacked, and the cell is constituted by sandwiching an electrolyte layer made of a solid oxide such as ceramic between an anode electrode (a fuel electrode) to which an anode gas (a fuel gas) as a fuel is supplied and a cathode pole (an air electrode) to which an air containing oxygen is supplied as a cathode gas (an oxidizing gas). In the fuel cell stack 1, the fuel such as hydrogen contained in the anode gas is reacted with oxygen in the cathode gas to generate the electric power, and an anode gas after the reaction (an anode off-gas) and a cathode gas after the reaction (a cathode off-gas) are discharged.

A solid oxide fuel cell system (hereinafter referred to as a fuel cell system 100) that includes the fuel cell stack 1 includes a fuel supply system that supplies the anode gas to the fuel cell stack 1, an air supply system that supplies the cathode gas to the fuel cell stack 1, and an air discharge system that discharges the anode off-gas and the cathode off-gas to an outside of the fuel cell system 100.

The fuel supply system includes a fuel tank 2, a separator 3, a fuel pump 4, an evaporator 5, a raw material heater 6, a reformer 7, and similar unit. The air supply system includes a cathode compressor 8, an air heat exchanger 9, a burner 10, a catalyst combustor 11, and similar unit. The air discharge system includes a discharged air combustor 12 and similar unit. The fuel cell system 100 includes a control unit 13 that controls operations of the entire system. The control unit 13 controls various kinds of equipment in the fuel cell system 100 to adjust the moisture content of the water-containing fuel used for driving the fuel cell system 100.

The following describes each system in detail. First, the fuel supply system will be described in detail.

In the fuel supply system, the separator 3, the fuel pump 4, the evaporator 5, the raw material heater 6, and the reformer 7 are disposed on an anode supply passage from the fuel tank 2 to the fuel cell stack 1.

The water-containing fuel stored in the fuel tank 2 is supplied to the separator 3 passing through a passage 101. For example, the water-containing fuel is a water-containing fuel that contains a water content such as a water-containing ethanol. The fuel tank 2 internally includes a detector 2A that obtains the moisture content of the water-containing fuel stored in the fuel tank 2. The detector 2A uses a difference in dielectric constant between the fuel (ethanol) and water, thus detecting or estimating the moisture content of the water-containing fuel. It should be noted that the water-containing fuel may include a hydrocarbon fuel other than ethanol.

The separator 3 separates a part of the water contained in the water-containing fuel. The separator 3 is configured such that a separation amount of the water from the water-containing fuel increases as an operation amount of the separator 3 increases. It should be noted that a detailed configuration of the separator 3 will be described later by referring to FIG. 3. The passage 101 includes a temperature sensor 14 and a flow rate sensor 15. The temperature sensor 14 obtains a temperature of the water-containing fuel supplied to the separator 3, and the flow rate sensor 15 obtains a flow rate of the water-containing fuel supplied to the separator 3.

The water-containing fuel where a part of the water is separated in the separator 3 reaches the fuel pump 4 passing through a passage 102, and is sent out to a passage 103 from the fuel pump 4. The passage 103 branches into passages 104, 105, and 106 on a downstream side. Therefore, the water-containing fuel flowing through the passage 103 is supplied to the evaporator 5 via the passage 104, and supplied to the discharged air combustor 12 via the passage 105. The passage 106 further branches into passages 107 and 108 in a downstream side. Therefore, the water-containing fuel flowing through the passage 106 is supplied to the burner 10 via the passage 107, and supplied to the catalyst combustor 11 via the passage 108.

The evaporator 5 uses a heat of a discharged gas from the discharged air combustor 12 to evaporate the water-containing fuel as a liquid, thus generating a fuel gas. The fuel gas generated by the evaporator 5 is supplied to the raw material heater 6 via a passage 109.

The raw material heater 6 is disposed adjacent to the discharged air combustor 12. The raw material heater 6 uses the heat generation in the discharged air combustor 12 to further heat the fuel gas to a temperature so as to be reformable in the reformer 7. Then, the fuel gas heated in the raw material heater 6 is supplied to the reformer 7 via a passage 110.

The fuel gas supplied to the reformer 7 is reformed into an anode gas through a catalytic reaction. This anode gas is supplied to the anode electrode of the fuel cell stack 1 from the reformer 7 via a passage 111. For example, when the water-containing fuel is the water-containing ethanol, the water-containing fuel is reformed into the anode gas that contains methane, hydrogen, carbon monoxide, and similar material.

Next, a description will be given of the air supply system in detail.

In the air supply system, an air as a cathode gas taken in from outside is taken into the fuel cell system 100 by the cathode compressor 8, and reaches the air heat exchanger 9 at first via a passage 112.

The air heat exchanger 9 uses the heat of the discharged gas from the discharged air combustor 12 to heat the cathode gas. The cathode gas heated by the air heat exchanger 9 is supplied to the burner 10 via a passage 113, and subsequently, supplied to the catalyst combustor 11 via a passage 114. The burner 10 and the catalyst combustor 11 are activated mainly in a system activation process in the fuel cell system 100. It should be noted that the system activation process is a process, for example, performed from when a pressing down of a start switch of a vehicle that includes a fuel cell system 100 to start the operation of the fuel cell system 100 until when the fuel cell stack 1 becomes to stably perform the electric generation.

On the activation of the fuel cell system 100, in the burner 10, the cathode gas supplied from the cathode compressor 8 is mixed with the water-containing fuel supplied from the fuel pump 4 via the passages 103, 106, and 107. Then, an ignition device attached to the burner 10 ignites the mixed gas to form a preheating burner for heating the catalyst combustor 11.

The catalyst combustor 11 is a unit that internally includes a catalyst, and uses this catalyst to generate a combustion gas having a high temperature. On the activation of the system, the cathode gas from the cathode compressor 8 and the water-containing fuel from the fuel pump 4 are supplied to the catalyst combustor 11. The catalyst in the catalyst combustor 11 has been heated by the preheating burner, and the cathode gas and the fuel contained in the water-containing fuel are combusted on the heated catalyst, thus generating a combustion gas. It should be noted that the combustion gases discharged from the burner 10 and the catalyst combustor 11 are inert gases containing little oxygen and having high temperatures.

Thus, on the activation of the fuel cell system 100, the fuel cell stack 1 is supplied with the inert gas warmed by the catalyst combustor 11 via a passage 115 so as to have the temperature to ensure the fuel cell stack 1 to perform the electric generation. Then, when the fuel cell stack 1 becomes to be in the temperature for appropriately performing the electric generation and the system activation process terminates, combustion reactions in the burner 10 and the catalyst combustor 11 terminate and the fuel cell stack 1 is supplied with the cathode gas heated by the air heat exchanger 9.

Thus, the fuel cell stack 1 is supplied with the anode gas from the fuel supply system, and is supplied with the cathode gas from the air supply system. Then, in the fuel cell stack 1, the anode gas reacts with the cathode gas to generate the electric power, and an anode off-gas and a cathode off-gas are discharged outside the fuel cell system 100 via the air discharge system.

Next, a description will be given of the air discharge system in detail.

The fuel cell stack 1 discharges the anode off-gas from a passage 116, and discharges the cathode off-gas from a passage 117. The anode off-gas and the cathode off-gas are combusted in the discharged air combustor 12 through an oxidation catalytic reaction, and discharged to a passage 118 as a discharged gas. The heat generated in accordance with the combustion is transmitted to the raw material heater 6 adjacent to the discharged air combustor 12. The discharged gas reaches the evaporator 5 via the passage 118, and subsequently, reaches the air heat exchanger 9 passing via a passage 119. Then, the discharged gas is finally discharged outside the fuel cell system 100 via a passage 120.

The discharged air combustor 12 is constituted of a ceramic material such as alumina, and mixes the anode off-gas with the cathode off-gas to combust the mixed gas through an oxidation catalyst, thus generating the discharged gas containing carbon dioxide and water as main components. The discharged air combustor 12 is configured to be supplied with the water-containing fuel via the passage 105. Adjusting a supply amount of the water-containing fuel supplied to the discharged air combustor 12 ensures controlling a catalytic combustion reaction in the discharged air combustor 12.

It should be noted that the control unit 13 controls a valve and similar part in each configuration and each system of the fuel cell system 100 to control the entire fuel cell system 100. It should be noted that the control unit 13 is configured of a microcomputer that includes a central processing unit (CPU), a read-only memory (ROM), a random access memory (RAM), and an input/output interface (an I/O interface).

Here, a detailed configuration of the separator 3 will be described by referring to FIG. 2.

Figure 2:
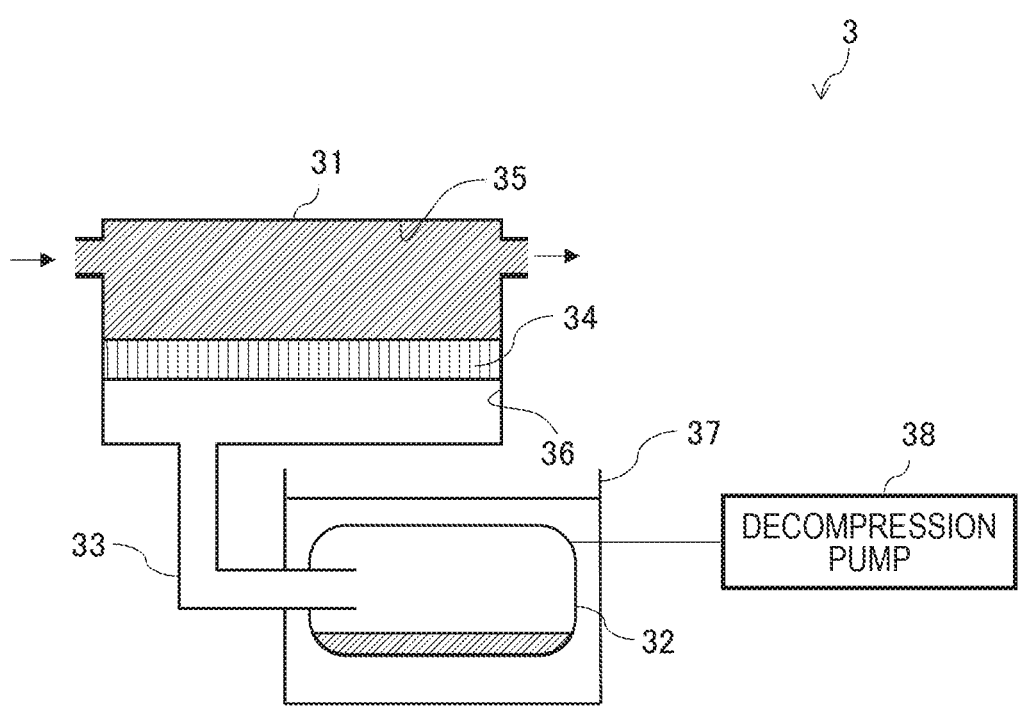
FIG. 2 is a block diagram of a separator.

By referring to FIG. 2, the separator 3 includes a fuel container 31, a cooling container 32, and a pipe 33 that couples the fuel container 31 to the cooling container 32. The fuel container 31 internally includes a water separation membrane 34 to provide a fuel chamber 35 where the water-containing fuel flows and an atmosphere chamber 36 where the water-containing fuel does not flow but an atmosphere exists. It should be noted that, specifically, the water separation membrane 34 is constituted of, for example, a polymer membrane without holes and a ceramic that has pores. The pipe 33 is coupled to the atmosphere chamber 36 in the fuel container 31. The cooling container 32 is configured to be cooled by being disposed in a water tank 37 and to be decompressed by a decompression pump 38.

When the decompression pump 38 is driven, air pressures in the cooling container 32, the pipe 33, and the atmosphere chamber 36 of the fuel container 31 decrease. In such a state, in the fuel container 31, a part of the water content contained in the water-containing fuel that resides on the fuel chamber 35 becomes water vapor to be transmitted through the water separation membrane 34, and reaches the atmosphere chamber 36. Then, this water vapor is liquefied again in the cooling container 32 cooled by water in the water tank 37. It should be noted that the water liquefied in the cooling container 32 is discharged outside the fuel cell system 100 at a predetermined timing. The cooling container 32 includes a drain communicated with the outside of the fuel cell system 100, and the liquefied water is discharged outside the fuel cell system 100 via this drain as necessary. The control unit 13 controls the driving of the decompression pump 38 so as to obtain a transmembrane pressure as a difference in pressure between the fuel chamber 35 and the atmosphere chamber 36, which are mutually adjacent via the water separation membrane 34, in a desired magnitude, thus ensuring controlling the moisture amount separated from the water-containing fuel.

Figure 3:
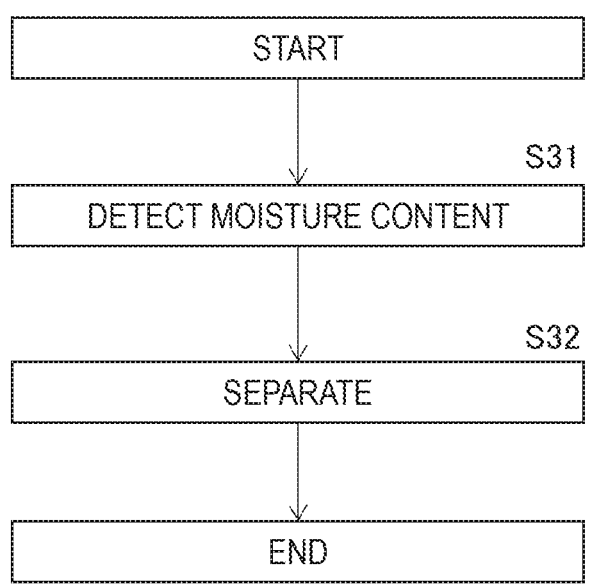
FIG. 3 is a flowchart illustrating a separation control process.

Next, by referring to FIG. 3, a description will be given of a separation control process performed by the control unit 13 of the embodiment. FIG. 3 illustrates an exemplary separation control process for separating a part of the water contained in water-containing fuel. This process is configured to be repeatedly performed at predetermined intervals from the activation to the termination of the fuel cell system 100.

In Step S31 (a detection step), the detector 2A disposed in the fuel tank 2 obtains the moisture content of the water-containing fuel stored in the fuel tank 2.

Then, in Step S32 (a separation step), the control unit 13 controls the separator 3 corresponding to the moisture content obtained by the detector 2A. Thus, the water-containing fuel sent out from the separator 3 by the fuel pump 4 has a desired moisture content.

Figure 4:
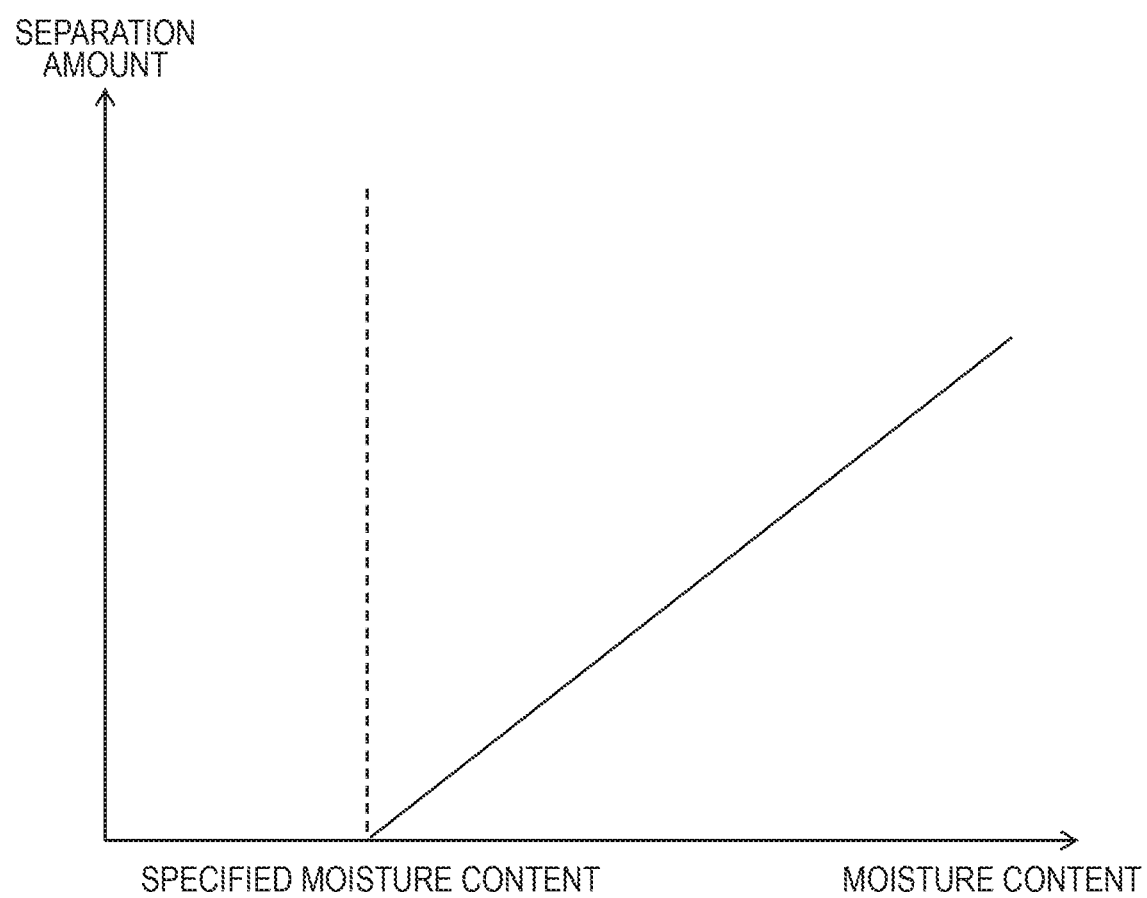
FIG. 4 is a graph illustrating a separation amount in the separation control process.

FIG. 4 illustrates a graph used for a process of Step S32 in FIG. 3. This graph is stored in the control unit 13. This graph indicates a separation amount of the water separated by the separator 3 corresponding to the moisture content obtained by the detector 2A. A horizontal axis indicates the moisture content of the water-containing fuel, and a vertical axis indicates the separation amount of the water in the separator 3. The moisture content of the water-containing fuel where the electric generation by the fuel cell stack 1 is appropriately performed is indicated as a specified moisture content.

When the moisture content of the water-containing fuel is below the specified moisture content, the separation control process on the water by the separator 3 is not performed. On the other hand, when the moisture content is above the specified moisture content, the separation control process on the water by the separator 3 is performed. Specifically, the separator 3 is controlled such that, as the moisture content increases, the separation amount increases. Then, the moisture content of the water-containing fuel supplied to the fuel supply system from the separator 3 can be mostly equalized to the specified moisture content.

It should be noted that when the separator 3 has a configuration that includes the water separation membrane 34 as illustrated in FIG. 2, the separation amount of the water separated by the separator 3 is determined corresponding to the transmembrane pressure. Therefore, the control unit 13 decides a control amount (a drive electric power) of the decompression pump 38 of the separator 3 such that the separation amount of the water in the separator 3 has the desired value, thus controlling the transmembrane pressure. The control unit 13 may control the decompression pump 38 by using a graph that indicates the transmembrane pressure on the vertical axis instead of the graph in FIG. 4.

Figure 5:
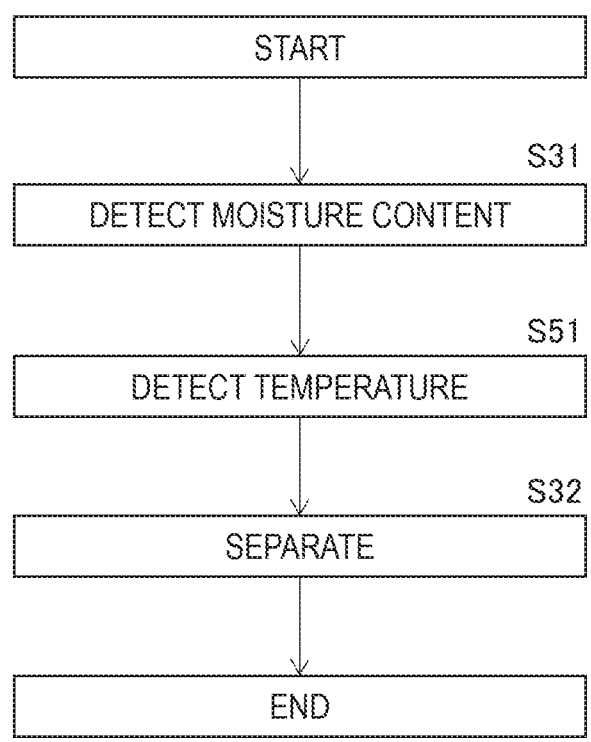
FIG. 5 is a flowchart illustrating another separation control process.

As a modification, another example of the separation control process is illustrated in FIG. 5.

The separation control process illustrated in FIG. 5 is different from the separation control process illustrated in FIG. 3 in that a process of Step S51 is added between Step S31 and S32.

In Step S51, the temperature sensor 14 disposed on the passage 101 between the fuel tank 2 and the separator 3 obtains a temperature of the water-containing fuel supplied to the separator 3. Here, it has been known that the separator 3 has a water separation capacity that differs depending on the temperature of the water-containing fuel. For example, when the separator 3 has the configuration that includes the water separation membrane 34 as illustrated in FIG. 2, the separation amount differs depending on the temperature of the water-containing fuel even in an identical transmembrane pressure. Specifically, as the temperature increases, the separation amount increases even in an identical transmembrane pressure, thus the water is separatable by a desired amount even if the transmembrane pressure is low.

Figure 6:
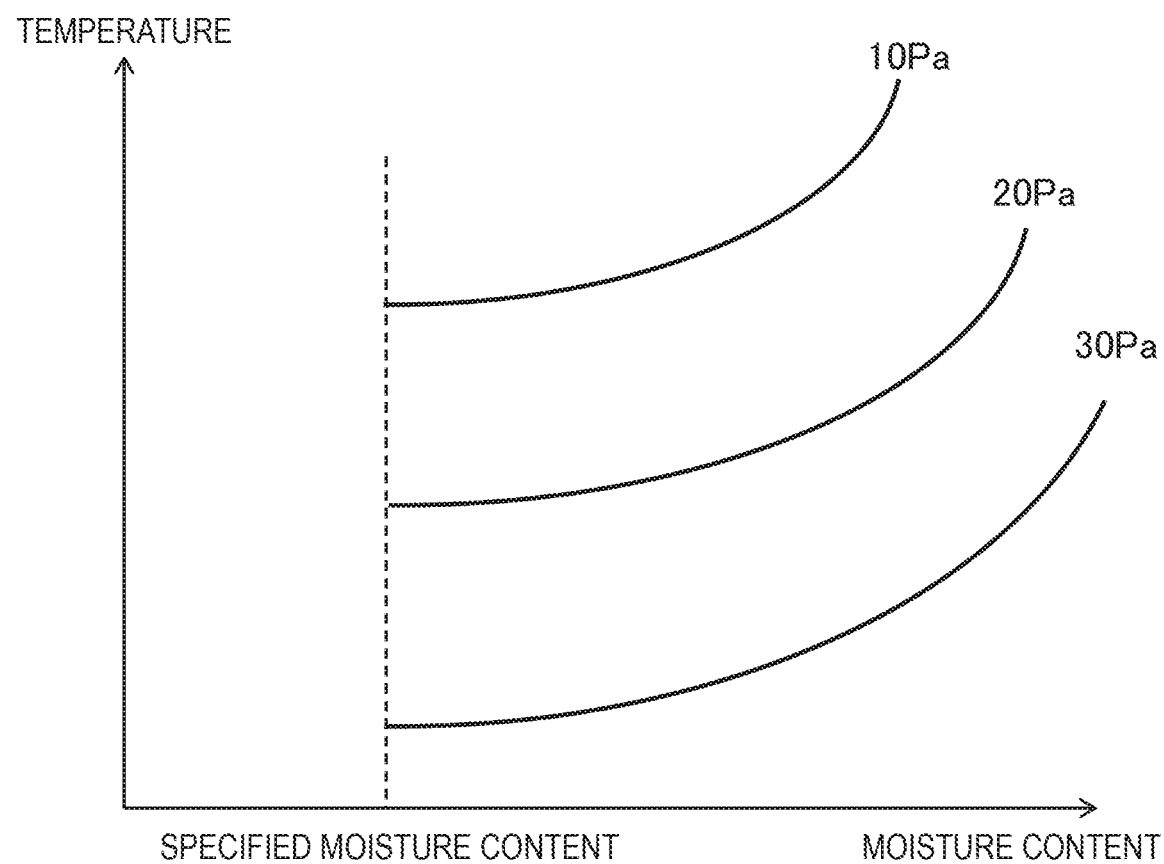
FIG. 6 is a graph illustrating a control amount by the separator in the other separation control process.

Therefore, the control unit 13 preliminarily stores a graph as illustrated in FIG. 6.

In the graph in FIG. 6, a vertical axis indicates the temperature of the water-containing fuel, and a horizontal axis indicates the moisture content of the water-containing fuel. Furthermore, the graph indicates the desired transmembrane pressures in the separator 3 corresponding to the temperature and the moisture content of the water-containing fuel.

The control unit 13 drives the decompression pump 38 so as to have the transmembrane pressure indicated on a position in FIG. 6 determined corresponding to the temperature of the water-containing fuel obtained by the temperature sensor 14 and the moisture content of the water-containing fuel obtained by the detector 2A. It should be noted that when the transmembrane pressure that corresponds to the position determined corresponding to the temperature and the moisture content is not indicated in FIG. 6, the control unit 13 determines the transmembrane pressure by a proportional distribution method and similar method. Thus, since the control unit 13 corrects the operation amount of the separator 3 corresponding to the temperature of the water-containing fuel obtained by the temperature sensor 14, the water can be accurately removed from the water-containing fuel by the desired amount.

Figure 7:
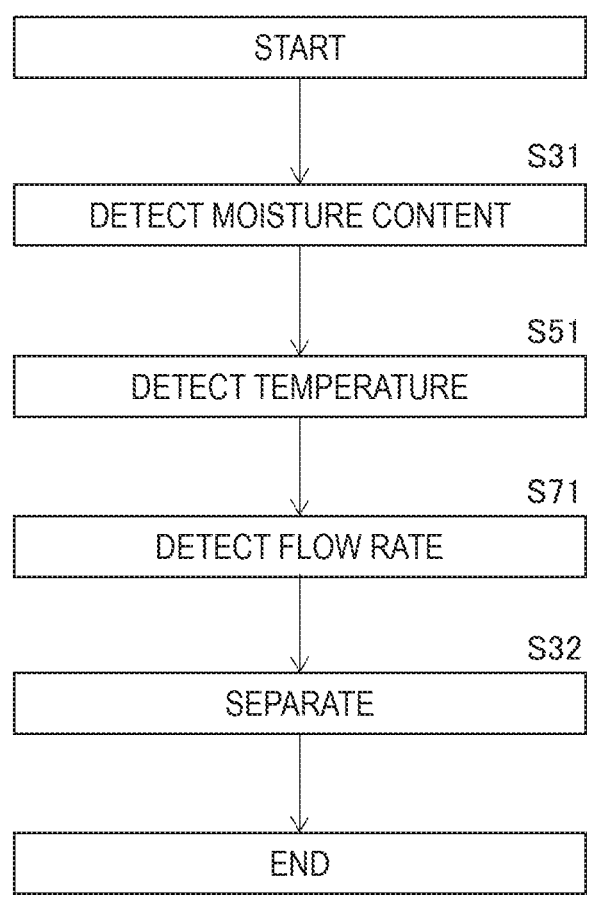
FIG. 7 is a flowchart illustrating yet another separation control process.

As a further modification, another example of the separation control process is illustrated in FIG. 7.

The separation control process illustrated in FIG. 7 is different from the separation control process illustrated in FIG. 5 in that a process of Step S71 is added between Steps S51 and S32.

In Step S71, the flow rate sensor 15 disposed on the passage 101 between the fuel tank 2 and the separator 3 obtains the flow rate of the water-containing fuel that flows in the separator 3. Here, it has been known that the separator 3 has the separation capacity that differs also depending on the flow rate of the water-containing fuel that flows in. For example, the separation amount differs depending on the flow rate even in the identical transmembrane pressure. Specifically, as the flow rate increases, the separation amount decreases.

Therefore, the control unit 13 preliminarily stores a plurality of graphs that indicate the relations between the temperature and separation amount, and the transmembrane pressure, as illustrated in FIG. 6, corresponding to the flow rate of the water-containing fuel that flows in the separator 3. Specifically, in the graphs, in the identical temperature and the identical moisture content of the water-containing fuel, the transmembrane pressure increases as the flow rate increases. The control unit 13 selects the graph that corresponds to the flow rate of the water-containing fuel obtained by the flow rate sensor 15, and uses the selected graph to obtain the transmembrane pressure that corresponds to the temperature and the moisture content of the water-containing fuel. Then, the control unit 13 drives the decompression pump 38 so as to have the obtained transmembrane pressure. Thus, since the control unit 13 corrects the operation amount of the separator 3 corresponding to the flow rate of the water-containing fuel obtained by the flow rate sensor 15, the water can be accurately removed from the water-containing fuel by the desired amount.

It should be noted that, while the detector 2A is disposed in the fuel tank 2 in this embodiment, this should not be construed in a limiting sense. The detector 2A may be disposed, namely, on the passages 101, 102, 103, 104, and similar passage insofar as on an upstream side of the evaporator 5 on the anode supply passage. In a case of a configuration where the fuel cell system 100 does not include the evaporator 5 and directly reforms the water-containing fuel into the anode gas in the reformer 7, the detector 2A is only necessary to be disposed on an upstream side of the reformer 7. Thus, since the moisture content of the water-containing fuel to be reformed into the anode gas is adjusted corresponding to the moisture content obtained by the detector 2A, the anode gas used for the electric generation by the fuel cell stack 1 can be appropriately generated.

The fuel cell system 100 of the first embodiment provides the following effects.

In the water-containing fuel stored in the fuel tank 2, the fuel (ethanol) easily evaporates compared with the water. Therefore, the water-containing fuel stored in the fuel tank 2 over a long period of time has a decreased fuel content and an increased moisture content. The water-containing fuel stored in the fuel tank 2 is reformed into the anode gas passing through a fuel supply passage (the passages 101, 102, 103, 104, 109, 110, and 111), and then, supplied to the fuel cell stack 1. When the water-containing fuel stored in the fuel tank 2 over a long period of time is used, the increased moisture content possibly causes the anode gas not to be appropriately supplied to the fuel cell stack 1 so as to reduce a power generation performance.

Therefore, according to the fuel cell system 100 of the first embodiment, the detector 2A that detects the moisture content of the water-containing fuel stored in the fuel tank 2, and the separator 3 that separates the water contained in the water-containing fuel are disposed. Then, the control unit 13 controls the separation amount of the water in the separator 3 corresponding to the moisture content detected by the detector 2A. Then, since the moisture content contained in the water-containing fuel decreases, the evaporation of the water-containing fuel into the fuel gas in the evaporator 5 and the reformation of the fuel gas into the anode gas in the reformer 7 are appropriately performed. Accordingly, the fuel cell stack 1 is appropriately supplied with the anode gas, thus ensuring reducing the decrease of the power generation performance in the fuel cell stack 1.

According to the fuel cell system 100 of the first embodiment, as illustrated in FIG. 2, when the moisture content detected by the detector 2A is above a specified amount (the specified moisture content), the separator 3 is controlled such that the more the moisture content increases, the more the water is separated. Then, since the moisture content of the water-containing fuel supplied from the separator 3 does not exceed the specified amount, the fuel cell stack 1 is appropriately supplied with the anode gas, thus ensuring reducing degradation of the power generation performance. The separator 3 operates only when the moisture content of the water-containing fuel is above the specified amount, and does not operate when the moisture content of the water-containing fuel is below the specified amount. Then, an unnecessary separation control process by the separator 3 can be reduced.

According to the fuel cell system 100 of the first embodiment, the temperature sensor 14 that obtains the temperature of the water-containing fuel supplied to the separator 3 is disposed. Here, it has been known that the separation amount of the water in the separator 3 differs depending on the temperature of the water-containing fuel. Therefore, the control unit 13 controls the separator 3 also corresponding to the temperature of the water-containing fuel obtained by the temperature sensor 14 in addition to the moisture content of the water-containing fuel. Specifically, as the temperature of the water-containing fuel increases, the drive electric power of the separator 3 is decreased. For example, when the separator 3 has the configuration that includes the water separation membrane 34 and the decompression pump 38 as illustrated in FIG. 2, the decompression pump 38 is controlled such that, as the temperature of the water-containing fuel increases, the transmembrane pressure decreases. Then, since an accuracy of the separation amount of the water in the separator 3 increases, the water can be separated by the desired amount, thus ensuring reducing the decrease of the power generation performance in the fuel cell stack 1.

According to the fuel cell system 100 of the first embodiment, the flow rate sensor 15 that obtains the supply amount of the water-containing fuel supplied to the separator 3 is disposed. Here, it has been known that the separation amount of the water in the separator 3 differs depending on the flow rate of the water-containing fuel. Therefore, the control unit 13 controls the separator 3 further corresponding to the flow rate of the water-containing fuel obtained by the flow rate sensor 15. Specifically, as the flow rate of the water-containing fuel increases, the drive electric power of the separator 3 is increased. For example, when the separator 3 has the configuration that includes the water separation membrane 34 and the decompression pump 38 as illustrated in FIG. 2, the decompression pump 38 is controlled such that, as the flow rate of the water-containing fuel increases, the transmembrane pressure increases. Then, since the accuracy of the separation amount of the water in the separator 3 further increases, the water can be separated by the desired amount, thus ensuring reducing the decrease of the power generation performance in the fuel cell stack 1.

According to the fuel cell system 100 of the first embodiment, the separator 3 includes the water separation membrane 34 to provide the fuel chamber 35 and the atmosphere chamber 36. When the atmosphere chamber 36 is decompressed to increase the transmembrane pressure as the difference between the pressure of the atmosphere chamber 36 and the pressure of the fuel chamber 35, a part of the water content contained in the water-containing fuel that resides on the fuel chamber 35 becomes water vapor to be transmitted through the water separation membrane 34, and reaches the atmosphere chamber 36. Accordingly, the control unit 13 controls the transmembrane pressure, thus ensuring accurately controlling the separation amount of the water in the separator 3.

According to the fuel cell system 100 of the first embodiment, the cooling container 32 coupled to the atmosphere chamber 36 of the fuel container 31 in the separator 3 via the pipe 33 is disposed, and the decompression pump 38 is disposed in the cooling container 32. Therefore, the control unit 13 drivingly controls the decompression pump 38 so as to have the desired transmembrane pressure. Then, the transmembrane pressure is controlled, thus ensuring accurately controlling the separation amount of the water in the separator 3.

Second Embodiment

While, in the first embodiment, the water separated in the separator 3 is discharged outside the fuel cell system 100, this should not be construed in a limiting sense. The water separated in the separator 3 may be used again in the fuel cell system 100.

Figure 8:
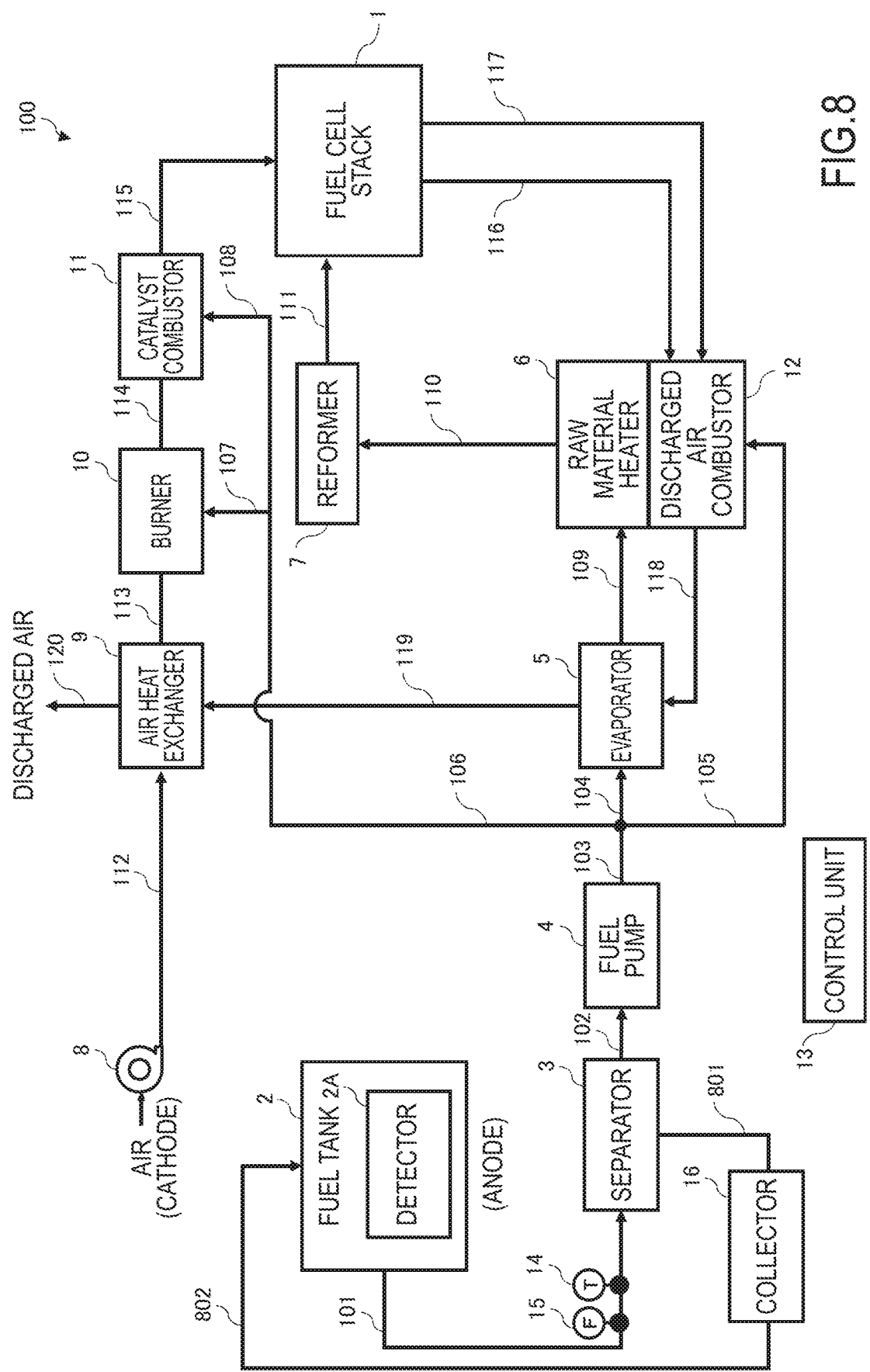
FIG. 8 is a block diagram of a fuel cell system of a second embodiment.

FIG. 8 is a block diagram of a fuel cell system 100 of a second embodiment. The fuel cell system 100 illustrated in FIG. 8 is different from the fuel cell system 100 in the first embodiment illustrated in FIG. 1 in that passages 801 and 802, and a collector 16 are disposed.

The collector 16 includes a tank and a pump. The water separated in the separator 3 reaches the collector 16 via the passage 801, and is stored in the tank in the collector 16. Then, the pump (a recovery pump) of the collector 16 supplies the water in the tank to the fuel tank 2 via the passage 802. Accordingly, the passages 801 and 802 correspond to a fuel recovery passage that recovers the separated water to supply to the fuel tank 2.

Figure 9:
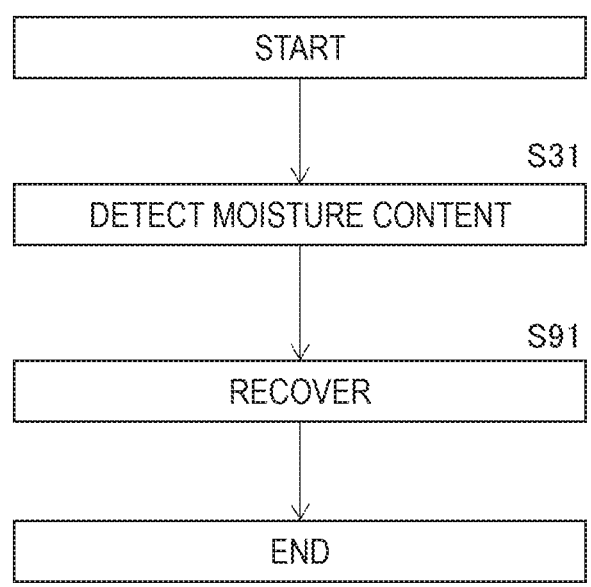
FIG. 9 is a flowchart illustrating a recovery control process.

FIG. 9 is a flowchart illustrating a recovery control process performed by the control unit 13.

The recovery control process illustrated in FIG. 9 is different from the separation control process in the first embodiment illustrated in FIG. 3 in that a process of Step S91 is performed instead of Step S32.

In Step S91, the pump of the collector 16 is driven corresponding to the moisture content of the water-containing fuel detected by the detector 2A, thus the water separated in the separator 3 is recovered in the fuel tank 2 via the passages 801 and 802.

Figure 10:
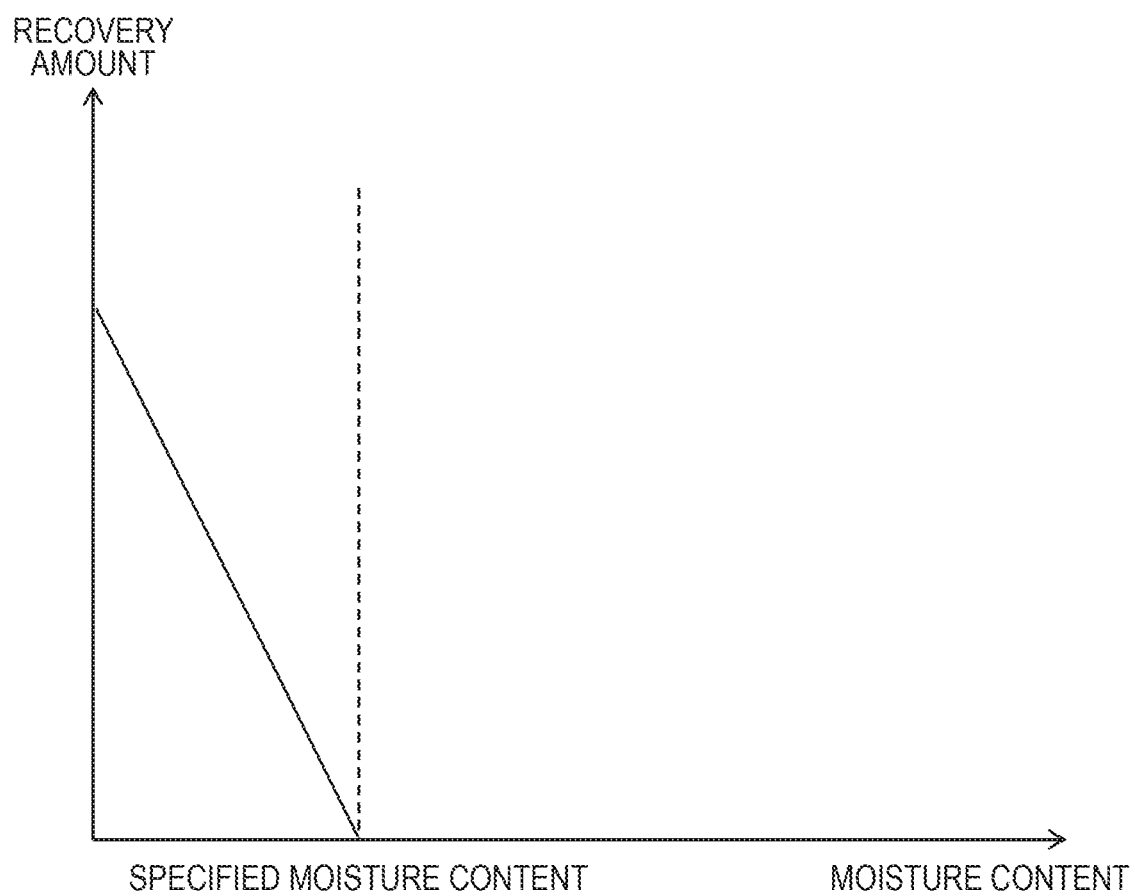
FIG. 10 is a graph illustrating a recovery amount of water in the recovery control process.

FIG. 10 illustrates a graph used for the process of Step S91 in FIG. 9. This graph is stored in the control unit 13. This graph indicates a recovery amount of the water recovered in the fuel tank 2 by the collector 16 corresponding to the moisture content obtained by the detector 2A. A horizontal axis indicates the moisture content of the water-containing fuel, and a vertical axis indicates the recovery amount of the water returned to the fuel tank 2. Similarly to FIG. 4, the specified moisture content is indicated.

When the moisture content of the water-containing fuel is below the specified moisture content, a recovery process is performed to recover the water separated by the separator 3 in the fuel tank 2. The control unit 13 controls the pump of the collector 16 such that, as the moisture content decreases, the recovery amount increases. Then, the moisture content of the water-containing fuel in the fuel tank 2 can be mostly equalized to the specified moisture content.

Figure 11:
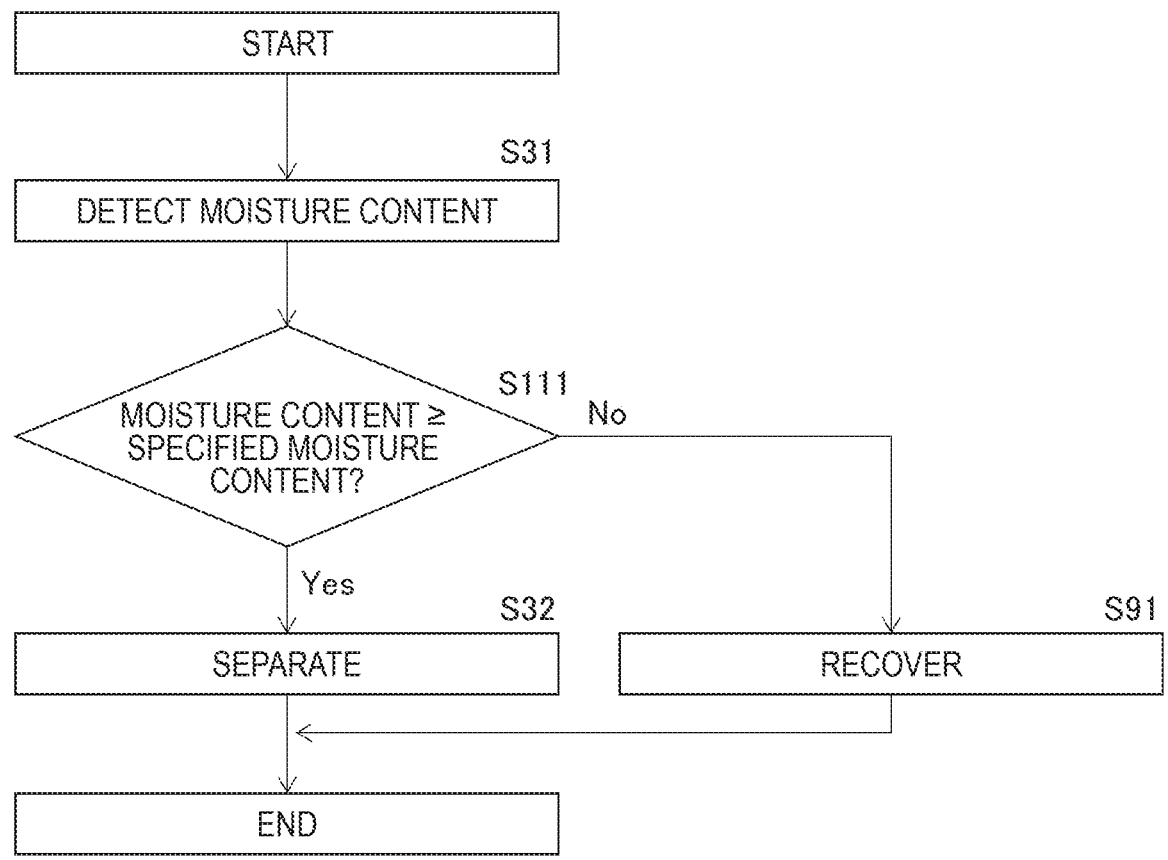
FIG. 11 is a flowchart illustrating a control process for performing the separation and the recovery.

FIG. 11 is a drawing illustrating a flowchart when the recovery control process of the embodiment is performed with the separation control process of the first embodiment. The flowchart illustrated in FIG. 11 is different from the flowchart of the first embodiment illustrated in FIG. 3 in that a determination process of Step S111 and a recovery process of Step S91 are added. It should be noted that, in Step S91, a process identical to the recovery process in the recovery control process illustrated in FIG. 9 is performed.

In Step S111, whether or not the moisture content of the water-containing fuel detected by the detector 2A is equal to or more than the specified moisture content is determined. When the moisture content is equal to or more than the specified moisture content (S111: Yes), it is determined that the water contained in the water-containing fuel needs to be separated, and the process proceeds to Step S32. On the other hand, when the moisture content is below the specified moisture content (S111: No), it is determined that the water contained in the water-containing fuel needs to be recovered in the fuel tank 2, and the process proceeds to the recovery control process of Step S91.

Then, when the moisture content of the water-containing fuel is higher than the specified moisture content, the separation control process is performed, and on the other hand, when the moisture content of the water-containing fuel is lower than the specified moisture content, the recovery control process is performed. Therefore, in any case, the moisture content of the water-containing fuel stored in the fuel tank 2 can be mostly equalized to the specified moisture content.

The fuel cell system 100 of the second embodiment provides the following effects.

When the moisture content of the water-containing fuel is below the specified moisture content, the water-containing fuel having a high fuel content is used for driving the fuel cell system 100. In such a case, the anode gas is supplied to the fuel cell stack 1 by an amount exceeding a predetermined amount, thus possibly failing to appropriately control the power generation performance.

Therefore, the recovery of the water separated in the separator 3 in the fuel tank 2 ensures increasing the moisture content of the water-containing fuel in the fuel tank 2. Accordingly, the moisture content of the water-containing fuel used for driving the fuel cell system 100 does not fall to below the specified moisture content. Then, the power generation performance of the fuel cell stack 1 can be more appropriately reduced.

Furthermore, as illustrated in FIG. 11, the separation control process of the first embodiment may be combined with the recovery control process of this embodiment. Then, when the moisture content of the water-containing fuel is above the specified moisture content, the separation control process is performed, thus decreasing the moisture content of the water-containing fuel so as to become mostly the specified moisture content. On the other hand, when the moisture content of the water-containing fuel is below the specified moisture content, the recovery control process is performed, thus increasing the moisture content of the water-containing fuel so as to become mostly the specified moisture content. Accordingly, the moisture content of the water-containing fuel used for driving the fuel cell system 100 is mostly equalized to the specified moisture content, thus ensuring the appropriate electric generation in the fuel cell stack 1.

Third Embodiment

While, in the first embodiment, the water-containing fuel where a part of the water is separated in the separator 3 is supplied to the burner 10, the catalyst combustor 11, and the discharged air combustor 12 via the fuel pump 4, this should not be construed in a limiting sense. In a third embodiment, a description will be given of an example where a part of the water-containing fuel after passing through the separator 3 is stored in a tank.

Figure 12:
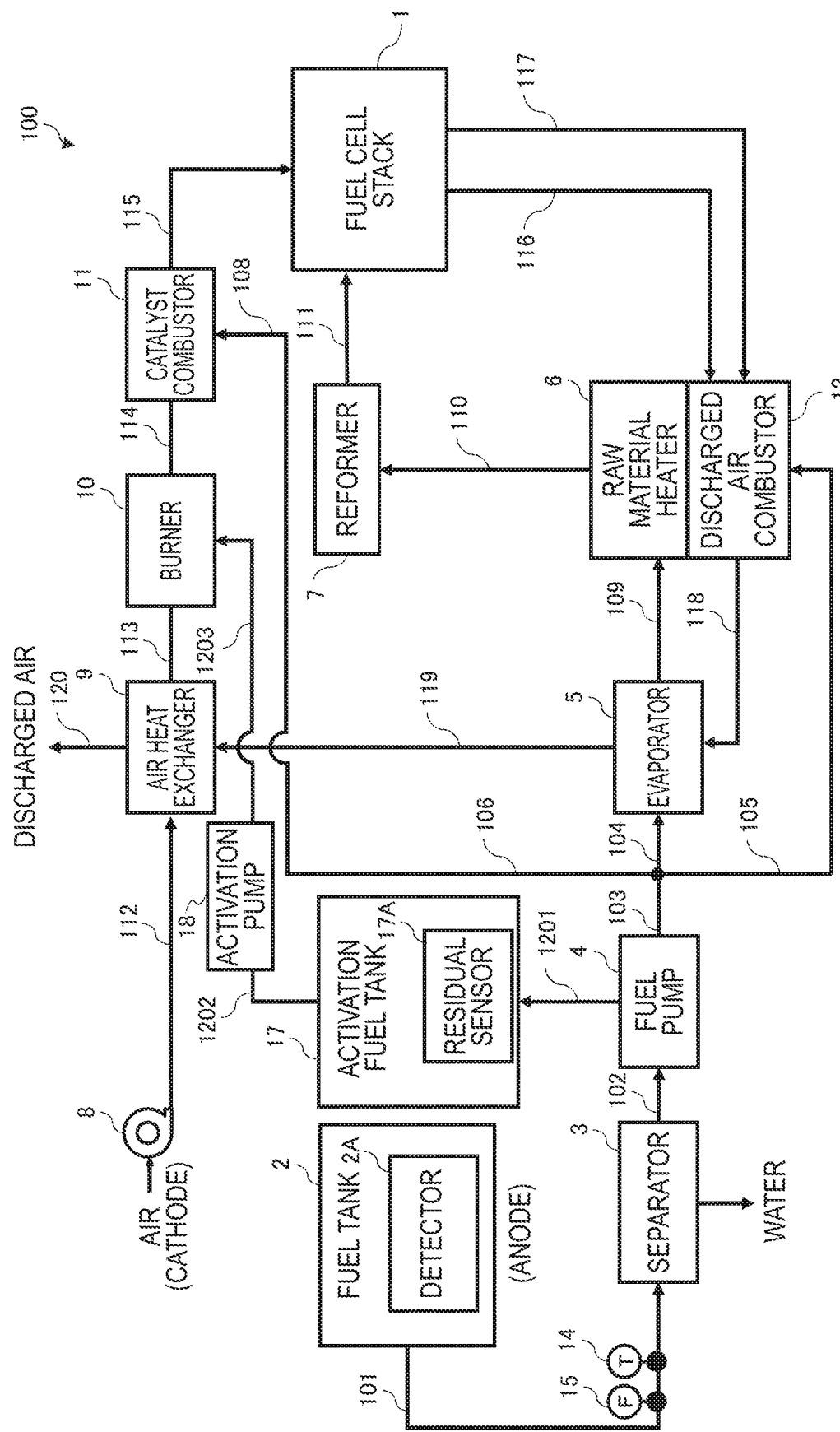
FIG. 12 is a block diagram of a fuel cell system of a third embodiment.

FIG. 12 is a block diagram of a fuel cell system 100 of the third embodiment. The fuel cell system 100 illustrated in FIG. 12 is different from the fuel cell system 100 of the first embodiment illustrated in FIG. 1 in that passages 1201, 1202, and 1203, an activation fuel tank 17, and an activation pump 18 are added. It should be noted that the activation fuel tank 17 includes a residual sensor 17A that obtains a remaining amount of the fuel in the activation fuel tank 17. The passages 1201, 1202, and 1203 serve as activation fuel passages where the fuel for activation flows. The burner 10 is referred to as an activation buener in some cases.

The water-containing fuel where a part of the water is separated in the separator 3 is stored in the activation fuel tank 17 from the fuel pump 4 via the passage 1201. Then, the water-containing fuel stored in the activation fuel tank 17 reaches the activation pump 18 via the passage 1202, and is supplied to the burner 10 via the passage 1203.

Figure 13:
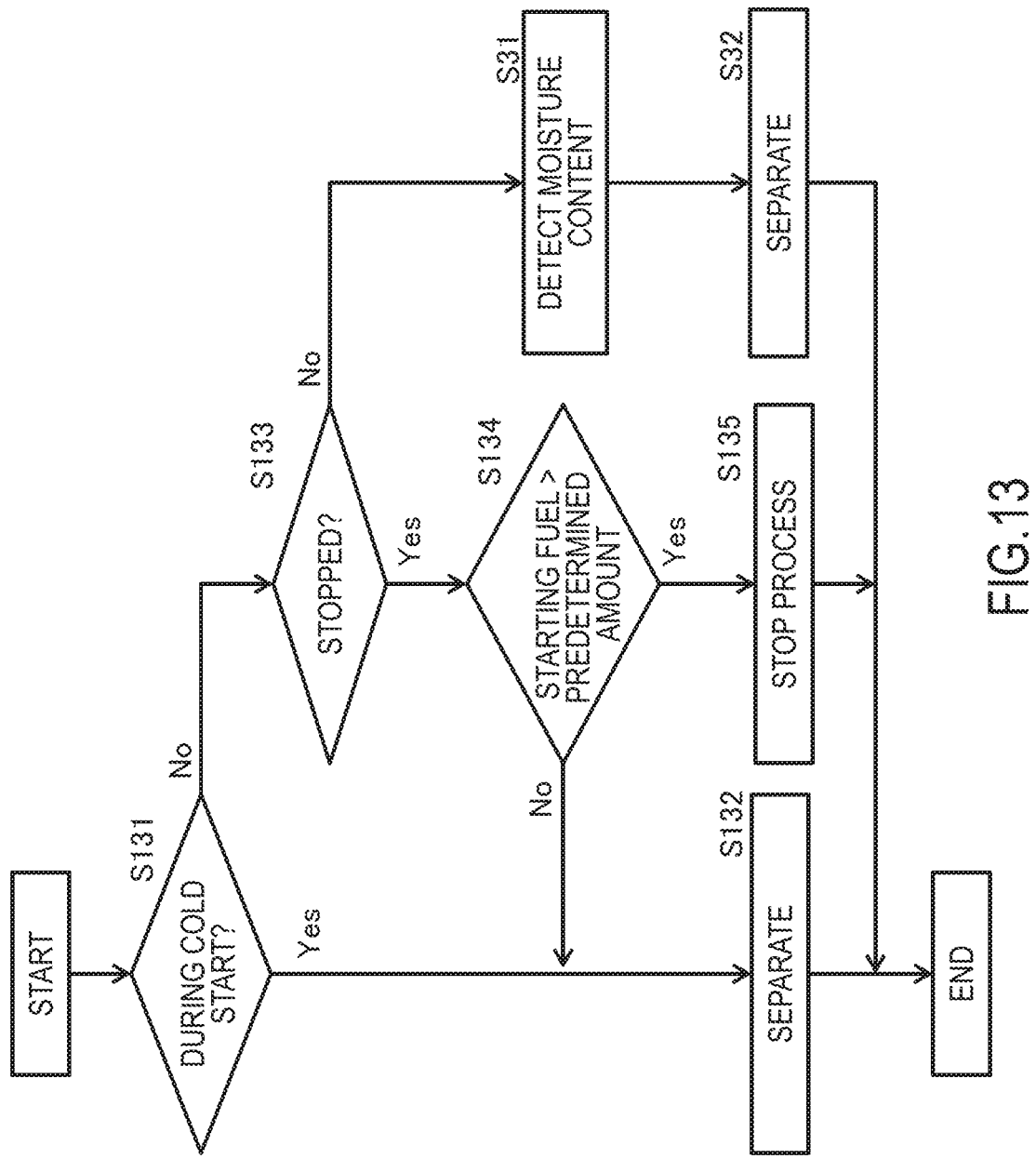
FIG. 13 is a flowchart illustrating a separation control process.

A control processing in the fuel cell system 100 is illustrated in FIG. 13.

First, in Step S131, the control unit 13 determines whether or not the fuel cell system 100 is in a cold start state. The cold start means that the fuel cell system 100 is activated in a low-temperature state in winter and similar situation. When in the cold start state, the water-containing fuel having a low moisture content compared with the ordinary moisture content is preferred to be used in the burner 10. This is because an ignition is less likely to occur in the burner 10 on the cold start.

Therefore, in Step S131, the control unit 13 determines whether the temperature of the fuel cell stack 1 is equal to or less than a predetermined cold start determination temperature to determine whether or not in the cold start state.

When the temperature of the fuel cell stack 1 is equal to or less than the cold start determination temperature, the control unit 13 determines it to be the cold start state (S131: Yes), and determines that it is necessary to cause the ignition in the burner 10 to easily occur, thus advancing the process to Step S132.

In Step S132, the control unit 13 controls the separator 3 so as to separate the water by a constant amount irrespective of the moisture content. For example, the separator 3 is driven at a maximum separation capacity. Then, the water-containing fuel having the low moisture content is stored in the activation fuel tank 17 via the fuel pump 4. Therefore, on the cold start, the water-containing fuel having the low moisture content is supplied from the activation fuel tank 17 via the activation pump 18, thus causing the ignition in the burner 10 to easily occur.

On the other hand, when the temperature of the fuel cell stack 1 is above the cold start determination temperature, the control unit 13 determines it not to be the cold start state (S131: No), and determines that it is not necessary to cause the ignition in the burner 10 to easily occur, thus advancing the process to Step S133.

In Step S133, the control unit 13 determines whether or not the fuel cell system 100 is performing a stop control process. It should be noted that the stop control of the fuel cell system 100 is started from a re-pressing of a start button of the vehicle and a state where a battery, in which the electric power generated in the fuel cell stack 1 is stored, becomes full charge. Then, the stop control terminates at a timing where the cooling of the fuel cell system 100 completes and the controls of various configurations of the fuel cell system 100 complete. A system stop control as the stop control process of the fuel cell system 100 is a control executed while the system is stopped, and while the system is stopped means a time period from a start of the system stop control to a next system activation.

Here, when the stop control process of the fuel cell system 100 completes, the water-containing fuel having the low moisture content compared with the ordinary moisture content is preferred to be stored in the activation fuel tank 17. Then, even if the fuel is much evaporated than the water in the water-containing fuel in the activation fuel tank 17 before restart of the fuel cell system 100, the moisture content is more likely to become lower than the specified moisture content. Therefore, on the restart of the fuel cell system 100, the water-containing fuel having the low moisture content is supplied from the activation fuel tank 17 via the activation pump 18, thus causing the ignition in the burner 10 to easily occur.

Then, when the control unit 13 determines that the fuel cell system 100 is stopped (S133: Yes), it is determined that the water-containing fuel having a comparatively low moisture content needs to be stored in the activation fuel tank 17, and the process proceeds to Step S134.

In Step S134, it is determined whether or not the remaining amount of the water-containing fuel in the activation fuel tank 17 obtained by the residual sensor 17A is above a predetermined reference amount. Here, the predetermined reference amount is configured to be greater than the amount of the water-containing fuel supplied to the burner 10 while the activation process of the fuel cell system 100 is performed.

When the remaining amount of the water-containing fuel in the activation fuel tank 17 is equal to or less than the predetermined reference amount (S134: No), it is determined that the water-containing fuel having the low moisture content needs to be further stored in the activation fuel tank 17, and the process proceeds to Step S132.

On the other hand, when the remaining amount of the water-containing fuel in the activation fuel tank 17 is above the predetermined reference amount (8134: Yes), it is determined that the water-containing fuel having the low moisture content does not need to be further stored in the activation fuel tank 17, and the process proceeds to Step S135.

In Step 135, the separator 3 and the fuel pump 4 are stopped. Then, the fuel cell system 100 is completely stopped.

It should be noted that when the fuel cell system 100 is not stopped (8133: No), the processes of Step S31 and S32 are performed similarly to the first embodiment.

It should be noted that the burner 10 is used mainly on the activation of the fuel cell system 100. Therefore, a valve and similar unit may be disposed between the separator 3 and the activation fuel tank 17 such that the valve is closed at the time other than the system activation. Then, such a water-containing fuel, which is generated while the fuel cell system 100 is in the usual operation and has the moisture content equal to the specified moisture content, can be prevented from being stored in the activation fuel tank 17. Accordingly, the moisture content of the water-containing fuel stored in the activation fuel tank 17 can be much lowered.

The fuel cell system 100 of the third embodiment provides the following effects.

According to the fuel cell system 100 of the third embodiment, on the activation of the fuel cell system 100, the separator 3 is driven by a predetermined driving force (for example, the maximum separation capacity) to generate the water-containing fuel where the moisture content is below the specified moisture content. Then, on the activation of the fuel cell system 100, the water-containing fuel having the low moisture content is supplied to the burner 10. Therefore, even in the case of the cold start of the fuel cell system 100, the burner 10 can be appropriately driven. Accordingly, a time period before heating the fuel cell stack 1 can be reduced, thus ensuring reducing a time period before the start of the electric generation in the fuel cell stack 1.

According to the fuel cell system 100 of the third embodiment, while the fuel cell system 100 is stopped, the separator 3 is driven by the predetermined driving force to generate the water-containing fuel such that the moisture content is below the specified moisture content, and this water-containing fuel is stored in the activation fuel tank 17. This operation is performed until the water-containing fuel is stored in the activation fuel tank 17 by a predetermined amount. Then, when the fuel cell system 100 is completely stopped, the water-containing fuel having the moisture content below the specified moisture content is stored in the activation fuel tank 17 by the predetermined amount. Therefore, even if the fuel is evaporated in the activation fuel tank 17 before the fuel cell system 100 is reactivated, it does not occur that the moisture content of the water-containing fuel in the activation fuel tank 17 significantly exceeds the specified moisture content. Accordingly, when the fuel cell system 100 is reactivated, the water-containing fuel having the moisture content nearly equal to the specified moisture content is supplied to the burner 10 to appropriately drive the burner 10, thus the decrease of the power generation performance of the fuel cell stack 1 can be reduced.

Fourth Embodiment

While the separator 3 is disposed between the fuel pump 4 and the evaporator 5 in the first embodiment, this should not be construed in a limiting sense. The separator 3 may be disposed so as to be adjacent to the evaporator 5.

Figure 14:
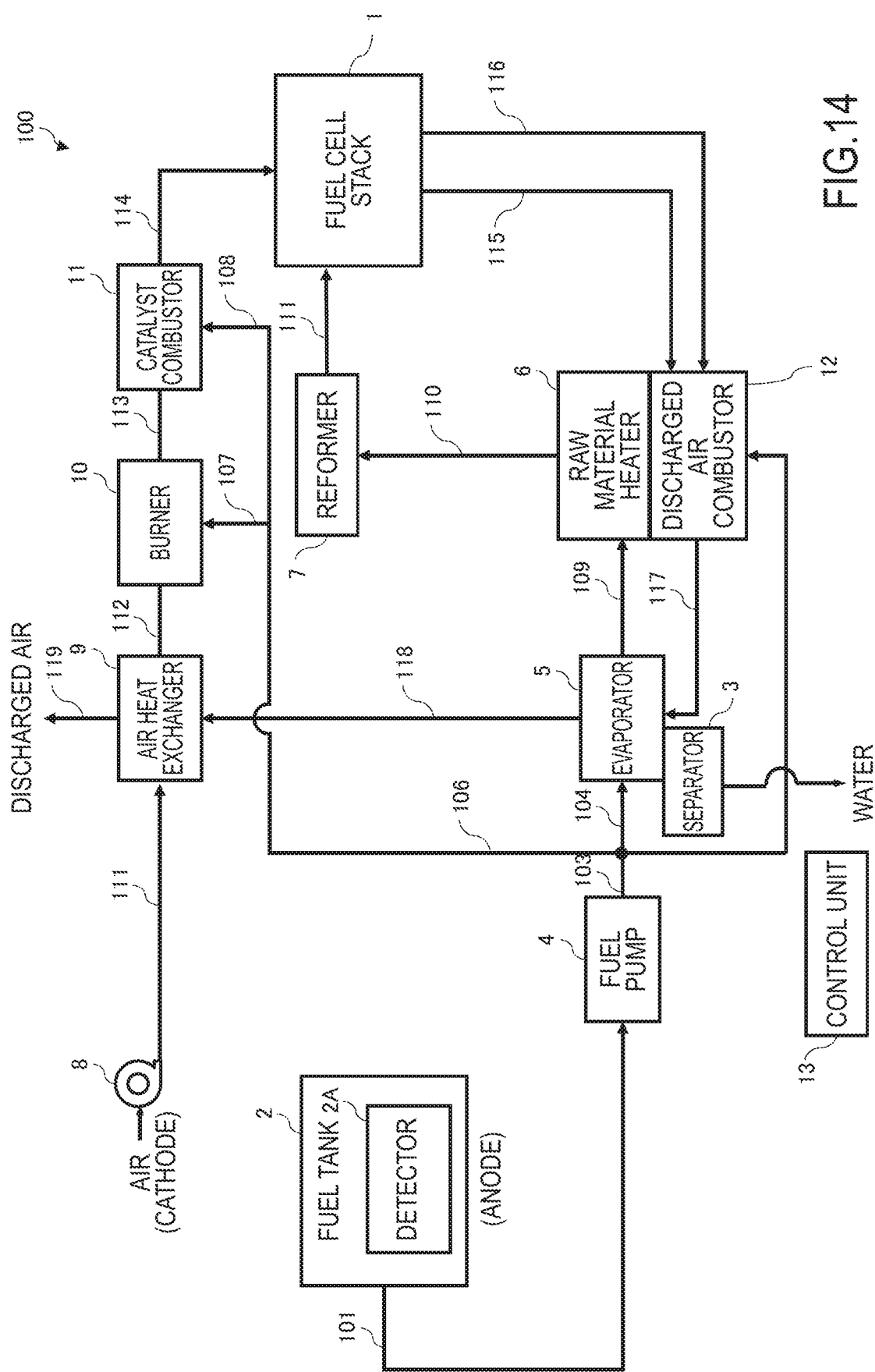
FIG. 14 is a block diagram of a fuel cell system of a fourth embodiment.

FIG. 14 is a block diagram of a fuel cell system 100 of a fourth embodiment. The fuel cell system 100 illustrated in FIG. 14 is different from the fuel cell system 100 of the first embodiment illustrated in FIG. 1 in that the separator 3 is disposed adjacent to the evaporator 5.

Figure 15:
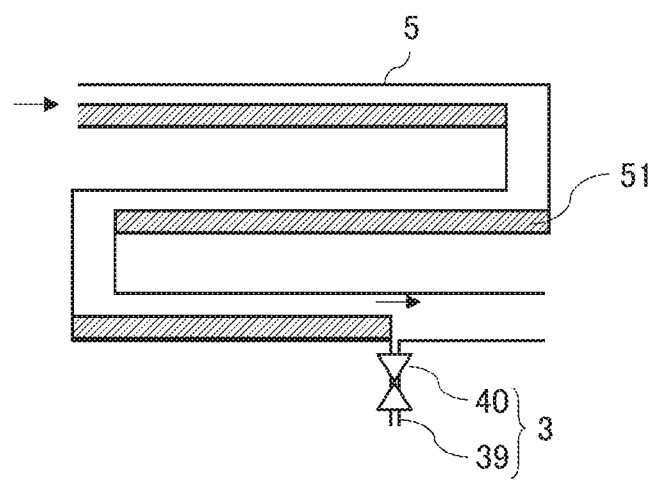
FIG. 15 is a block diagram of another separator.

FIG. 15 illustrates an exemplary detailed configuration of the separator 3 and the evaporator 5.

The evaporator 5 is configured as a flow passage where the water-containing fuel flows, and a water-containing fuel 51 is warmed to be evaporated by a heat of a discharged air from the discharged air combustor 12. On a downstream end of the flow passage of the evaporator 5, the separator 3 is disposed. The separator 3 is constituted of a drain 39 that discharges the water-containing fuel 51 on the flow passage of the evaporator 5 to the outside of the fuel cell system 100, and a valve 40 configured to open/close the drain 39.

Here, even in the evaporator 5, the fuel is easily evaporated compared with the water in the water-containing fuel 51. Therefore, in the evaporator 5, since the fuel is more evaporated than the water in the upstream side, the moisture content of the water-containing fuel becomes high in the downstream side. Then, the drain 39 disposed on the downstream side of the evaporator 5 can discharge the water-containing fuel having the high moisture content to the outside of the fuel cell system 100.

Thus, since an evaporation speed of the water-containing fuel is appropriately controlled in the evaporator 5, the reformer 7 is supplied with the fuel gas by an appropriate amount. Then, the anode gas is sufficiently generated in the reformer 7, thus reducing the decrease of the power generation performance of the fuel cell stack 1. It should be noted that the control unit 13 operates the valve 40 corresponding to the moisture content of the water-containing fuel in the fuel tank 2 detected by the detector 2A.

Specifically, when the moisture content of the water-containing fuel in the fuel tank 2 is high, an opening amount of the valve 40 is increased. Then, since a time period where the water-containing fuel stays on the upstream side of the evaporator 5 becomes longer, much more fuel is evaporated to ensure increasing the fuel gas generation. On the other hand, when the moisture content of the water-containing fuel in the fuel tank 2 is low, the opening amount of the valve 40 is decreased. Then, since the time period where the water-containing fuel stays on the upstream side of the evaporator 5 becomes shorter, the amount of the fuel gas generated by evaporation is decreased to ensure reducing the fuel gas generation. Thus, the amount of the fuel gas generated in the evaporator 5 is controlled.

The fuel cell system 100 of the fourth embodiment provides the following effects.

In the fuel cell system 100 of the fourth embodiment, the separator 3 is disposed adjacent to the evaporator 5. Then, the moisture content adjusted in the more downstream side of the fuel supply system ensures more appropriate adjustment of the supply amount of the anode gas to the fuel cell stack 1, compared with the case where the separator 3 is disposed between the fuel pump 4 and the fuel tank 2 as the first embodiment. Furthermore, the need for the configuration such as the water separation membrane 34 and the decompression pump 38 as the first embodiment is eliminated, thus ensuring simplification of the configuration.

The embodiments of the present invention described above are merely illustration of some application examples of the present invention and not of the nature to limit the technical scope of the present invention to the specific constructions of the above embodiments. The above-described embodiments may be combined as necessary.

The present application claims a priority of Japanese Patent Application No. 2015-243981 filed with the Japan Patent Office on Dec. 15, 2015, and all the contents of which are hereby incorporated by reference.

The invention claimed is:

1. A fuel cell system comprising:
   a solid oxide fuel cell that is configured to be supplied with an anode gas and a cathode gas to generate electric power;
   a fuel tank configured to store a water-containing fuel containing water;
   a fuel supply passage that couples the fuel cell to the fuel tank;
   a reformer disposed in the fuel supply passage, the reformer configured to reform the water-containing fuel into the anode gas;
   a separator disposed in the fuel supply passage in an upstream side with respect to the reformer, the separator configured to separate water contained in the water-containing fuel and the separator is configured to separate an increased amount of water from the water-containing fuel as an operation amount of the separator increases;
   a detector disposed in the upstream side with respect to the reformer, the detector configured to detect or estimate a moisture content contained in the water-containing fuel;
   a temperature sensor configured to obtain a temperature of the water containing fuel supplied to the separator; and
   a controller programmed to control the separator based on the moisture content detected or estimated by the detector such that a separation amount of the water separated from the water-containing fuel increases as moisture content increases, and
   the controller is programmed to correct the operation amount of the separator to be decreased as the temperature of the water-containing fuel obtained by the temperature sensor increases,
   wherein the separator comprises
      a separation membrane that separates a fuel chamber in which the water-containing fuel flows and an atmosphere chamber in which an atmosphere resides, and
      a decompression pump configured to decompress the atmosphere chamber.

2. The fuel cell system according to claim 1, comprising a flow rate sensor configured to obtain a flow rate of the water-containing fuel supplied to the separator, wherein the controller is programmed to correct the operation amount of the separator to be increased as the flow rate of the water-containing fuel obtained by the flow rate sensor increases.

3. The fuel cell system according to claim 1, wherein the separator is configured to discharge the water separated from the water-containing fuel to an outside of the fuel cell system.

4. The fuel cell system according to claim 1, further comprising:
   a fuel recovery passage configured to return the water separated from the water-containing fuel by the separator to the fuel tank; and
   a recovery pump disposed in the fuel recovery passage, wherein
   the controller is programmed to control the recovery pump on the basis of the moisture content.

5. The fuel cell system according to claim 4, wherein the controller is programmed to control the recovery pump such that a recovery amount of water returned to the fuel tank increases as the moisture content decreases.

6. The fuel cell system according to claim 1, further comprising:
   an activation burner configured to heat the cathode gas supplied to the fuel cell on an activation of the fuel cell system;
   an activation fuel tank configured to store the water-containing fuel after the water is separated by the separator; and
   an activation fuel passage that couples the activation fuel tank to the activation burner.

7. The fuel cell system according to claim 6, wherein the controller is programmed to control the separator such that the moisture content of the water-containing fuel becomes below a specified amount on the activation of the fuel cell system.

8. The fuel cell system according to claim 6, further comprising
   a residual sensor configured to obtain a remaining amount of the water-containing fuel in the activation fuel tank, wherein
   the controller is programmed to control the separator such that the moisture content of the water-containing fuel becomes below a specified amount when the remaining amount of the water-containing fuel in the activation fuel tank obtained by the residual sensor is below a fuel amount when the fuel cell system is stopped, the fuel amount being an amount of fuel consumed by the activation burner on the activation of the fuel cell system.

9. The fuel cell system according to claim 1, wherein the controller is programmed to control a transmembrane pressure as a difference in pressure between the fuel chamber and the atmosphere chamber separated by the separation membrane.

10. The fuel cell system according to claim 9, wherein the controller is programmed to control the decompression pump.

11. The fuel cell system according to claim 1, further comprising
    an evaporator disposed in the fuel supply passage in the upstream side with respect to the reformer, the evaporator configured to evaporate the water-containing fuel, wherein
    the separator is disposed adjacent to the evaporator.

12. The fuel cell system according to claim 1, wherein the separation membrane comprises a polymer membrane and a ceramic.

13. The fuel cell system according to claim 12, wherein the ceramic has pores.

14. The fuel cell system according to claim 1,
    wherein the separator further comprises
      a fuel container;
      a cooling container; and
      a pipe that couples the fuel container to the cooling container,
    wherein the separation membrane is disposed in the fuel container and divides the fuel container into the fuel chamber and the atmosphere chamber, and
    wherein the decompression pump is configured such that driving the decompression pump decreases an air pressure in the cooling container, the pipe, and the atmosphere chamber of the fuel container.

15. A control method for a fuel cell system that includes a solid oxide fuel cell, the solid oxide fuel cell being supplied with an anode gas and a cathode gas to generate an electric power, the anode gas being reformed from a water-containing fuel, the control method for the fuel cell system comprising:

- detecting or estimating a moisture content of the water-containing fuel;
- separating, with a separator, water from the water-containing fuel corresponding to the moisture content detected or estimated in the step of detecting or estimating the moisture content of the water-containing fuel;
- separating an increased amount of water from the water-containing fuel as an operation amount of the separator increases;
- obtaining a temperature of the water containing fuel supplied to the separator;
- controlling the separator based on the moisture content detected or estimated in the step of detecting or estimating the moisture content of the water-containing fuel such that a separation amount of the water separated from the water-containing fuel increases as the moisture content increases; and
- correcting the operation amount of the separator to be decreased as the temperature of the water-containing fuel obtained in the step of obtaining the temperature of the water containing fuel increases, wherein the separator comprises
- a separation membrane that separates a fuel chamber in which the water-containing fuel flows and an atmosphere chamber in which an atmosphere resides, and a decompression pump that decompresses the atmosphere chamber.

* * * * *